US008419989B2

(12) United States Patent
Newton

(10) Patent No.: US 8,419,989 B2
(45) Date of Patent: Apr. 16, 2013

(54) PROCESS AND APPARATUS FOR THE PRODUCTION OF YARN

(75) Inventor: Christopher William Newton, Richmond, VA (US)

(73) Assignees: Magellan Systems International LLC, Wilmington, DE (US); E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/443,825

(22) PCT Filed: Oct. 30, 2007

(86) PCT No.: PCT/US2007/082935
§ 371 (c)(1),
(2), (4) Date: Apr. 1, 2009

(87) PCT Pub. No.: WO2008/055130
PCT Pub. Date: May 8, 2008

(65) Prior Publication Data
US 2010/0072658 A1    Mar. 25, 2010

Related U.S. Application Data

(60) Provisional application No. 60/855,776, filed on Oct. 31, 2006.

(51) Int. Cl.
*B29C 47/88* (2006.01)
(52) U.S. Cl.
USPC .................. 264/184; 264/211.15; 264/211.16
(58) Field of Classification Search .................. 264/184, 264/211.15, 211.16
See application file for complete search history.

(56) References Cited

U.S. PATENT DOCUMENTS

| 2,324,397 | A | * | 7/1943 | Hull ............................. 264/180 |
| 3,094,511 | A | | 6/1963 | Hill, Jr. et al. |
| 3,227,793 | A | | 1/1966 | Cipriani |
| 3,354,127 | A | | 11/1967 | Hill, Jr. et al. |
| 3,414,645 | A | | 12/1968 | Morgan, Jr. |
| 3,673,143 | A | | 6/1972 | Bair et al. |
| 3,767,756 | A | | 10/1973 | Blades |

(Continued)

FOREIGN PATENT DOCUMENTS

| EP | 0 449 197 B1 | 7/1996 |
| JP | 61-102413 | 5/1986 |
| WO | WO 93/20400 | 10/1993 |
| WO | WO 98/18984 | 5/1998 |

OTHER PUBLICATIONS

W. B. Black and J. Preston; Fiber-Forming Aromatic Polymides; Man-Made Fibers, Science and Technology; vol. 2, pp. 297-299; Interscience Publishers a division of John Wiley & Sons, New York.

*Primary Examiner* — James Sanders

(57) ABSTRACT

The present invention concerns a process and apparatus for spinning polymer filaments comprising extruding a polymer solution to form one or more filaments into an air gap above a coagulation liquid, where the filaments are subject to strain; forming a downward stream of liquid and filaments by contacting the polymer solution with a coagulation liquid; passing the filaments and liquid through a quench tube; contacting the liquid with a surface such that the downward force of gravity on the liquid does not increase the strain of the filaments in the air gap; and separating the liquid from the filaments.

17 Claims, 2 Drawing Sheets

U.S. PATENT DOCUMENTS

| | | |
|---|---|---|
| 3,819,587 A | 6/1974 | Kwoleck |
| 3,869,429 A | 3/1975 | Blades |
| 3,940,955 A | 3/1976 | Welsh |
| 3,996,321 A | 12/1976 | Weinberger |
| 4,070,431 A | 1/1978 | Lewis et al. |
| 4,078,034 A | 3/1978 | Lewis |
| 4,172,938 A | 10/1979 | Mera et al. |
| 4,298,565 A | 11/1981 | Yang |
| 4,728,473 A * | 3/1988 | Satoh et al. .................. 264/101 |
| 4,965,033 A | 10/1990 | Chiou |
| 5,667,743 A | 9/1997 | Tai et al. |
| 5,674,969 A | 10/1997 | Sikkema et al. |
| 2005/0003727 A1* | 1/2005 | Chiou .......................... 442/239 |

* cited by examiner

PROCESS AND APPARATUS FOR THE PRODUCTION OF YARN

RELATED INVENTIONS

This application claims benefit of U.S. Provisional Application No. 60/855,776, filed Oct. 31, 2006, the disclosure of which is incorporated herein by reference in its entirety.

FIELD OF THE INVENTION

The present invention relates a process and apparatus for the production of filaments and yarns by solution spinning.

BACKGROUND OF THE INVENTION

Wet spinning processes for fibers with a liquid extraction and washing apparatus are disclosed in U.S. Pat. Nos. 3,996,321 and 3,940,955. In these processes, after the coagulating liquor exits the coagulating zone, the liquid accelerates due to gravity. Once the coagulating liquor exceeds the spinning speed, filaments are usually drawn by the higher speed liquor. This causes poor control of the coagulating liquor and creates loops in the fiber, which affects spinning continuity.

One strategy for minimizing the problem discussed in the previous paragraph when spinning an acidic solution of an aromatic polyamide is to spin the fiber downward through a non-coagulating fluid into a coagulating bath and subsequently through a spin tube is taught by U.S. Pat. Nos. 4,965,033, 4,728,473, 4,298,565, 4,078,034, and 4,070,431. It can be difficult, however, to string up yarn through a spin tube, especially with long spin tubes that are needed in some processes.

Thus, there is a need in the art for an improved spin process that avoids the aforementioned problems.

SUMMARY OF THE INVENTION

In some embodiments, the invention concerns a process for spinning polymer filaments comprising:
 a) extruding a polymer solution to form one or more filaments into an air gap above a coagulation liquid, where the filaments are subject to strain;
 b) forming a downward stream of liquid and filaments by contacting the polymer solution with a coagulation liquid;
 (c) passing the filaments and liquid through a quench tube;
 c) contacting the liquid with a surface such that the downward force of gravity on the liquid does not increase the strain on the filaments in the air gap; and
 d) separating the liquid from the filaments.

In certain embodiments, the invention concerns a process for spinning polymer filaments comprising:
 a) extruding a polymer solution into filaments in an air gap between a spinneret and a coagulating liquid, the filaments having a certain strain in the air gap imparted by one or more pull rolls,
 b) contacting the filaments with a liquid to coagulate the filaments and form a downward stream of liquid and filaments through a quench tube,
 c) contacting the liquid with a surface such that the downward force of gravity on the liquid does not increase the strain on the filaments in the air gap;
 d) separating the liquid from the filaments, and
 e) forwarding the filaments by the use of one or more pull roll.

In some embodiments, the surface comprises a plate. In certain embodiments, the surface comprises a plurality of plates. The surface can comprise two parallel plates. Some surfaces and plates are curved.

In some embodiments, the process further comprises collecting the filaments. In certain processes, the filaments are collected by winding the filaments on a tube. In some processes, the filaments are wound at a speed of at least 500 or at least 800 meters per minute.

One polymer that can be spun by the processes described herein is aramid polymer. In one embodiment, the aramid is para-aramid. In certain embodiments, the aramid is poly(p-phenylene terephthalamide).

In other embodiments, the polymer comprises a polyareneazole, such as polybenzoxazole or polybenzothiazole, or poly{2,6-diimidazo[4,5-b4',5'-e]pyridinylene-1,4(2,5-dihydroxy)phenylene}.

Also provided is an apparatus for producing filaments. In some embodiments, the invention concerns an apparatus for controlling the strain on spun filaments in an air gap, comprising:
 a) a spinneret,
 b) a coagulation bath having a quench tube disposed beneath the spinneret, and
 c) a pair of spaced-apart vertically parallel surfaces disposed beneath the quench tube forming a vertical slot, the vertical slot having a width dimension being the linear distance between the parallel surfaces,
 wherein the spinneret, quench tube, and vertical slot are all aligned along a centerline, and the width of the vertical slot is smaller than the inside diameter of the quench tube.

In some embodiments, the surfaces comprise two parallel plates. In certain embodiments, the surfaces are curved.

DETAILED DESCRIPTION OF ILLUSTRATIVE EMBODIMENTS

Figure 1:
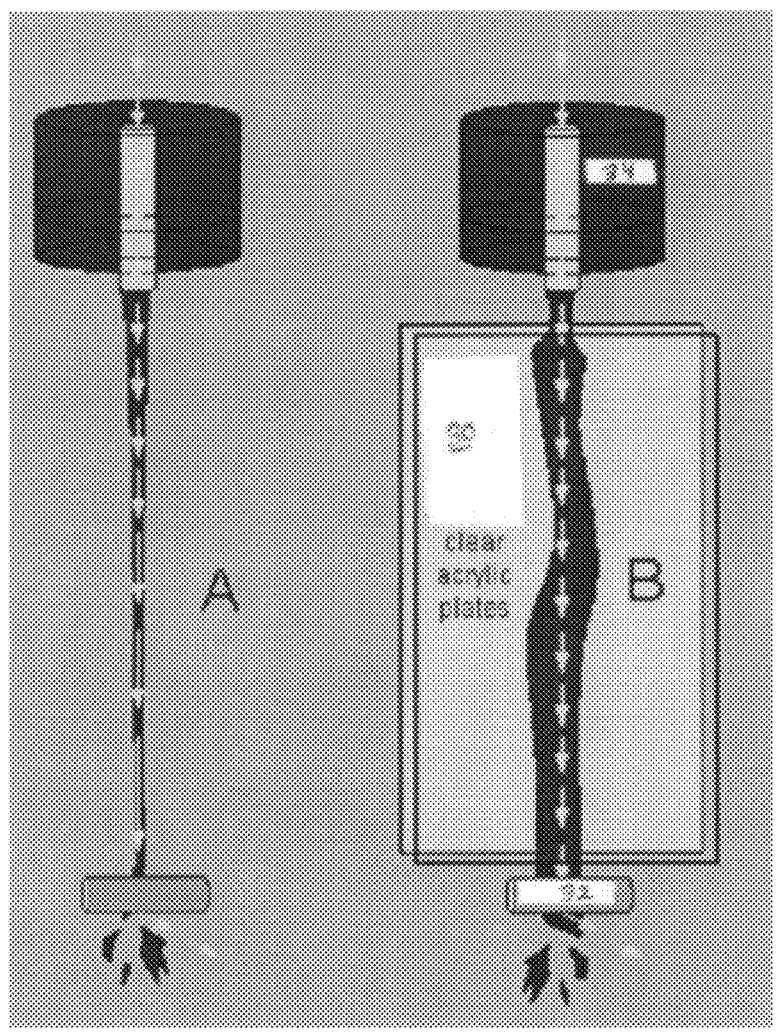
FIG. 1 shows a conventional quench spinning process (A) and a process of one embodiment of the instant invention utilizing parallel plates (B) to contact the liquid.

The present invention may be understood more readily by reference to the following detailed description taken in connection with the accompanying figures and examples, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

In the instant invention, after the quench tube and prior to separating the liquid from the filaments, the liquid in the stream contacts a surface such that the downward force of gravity on the liquid does not increase the strain of the filaments in the air gap. In one embodiment, a parallel plate apparatus is used under quench for wet spinning to control quench liquor fluid mechanics (see, FIG. 1, process B). Adjustment of the gap between these plates alters filament boundary layer conditions and results in controlled water velocity and increased liquid exchange in the yarn bundle.

One advantage of the instant invention is easy string up of the yarn. In one embodiment, the yarn can be pulled into the slot between the parallel plates from one side.

The instant process and apparatus is useful for the spinning a wide variety of polymers. A representative list of polymers suitable for this invention include aramid, polybenzoxazole, polybenzothiazole, poly {2,6-diimidazo[4,5-b4',5'-e]pyridinylene-1,4(2,5-dihydroxy)phenylene} (PIPD), and mixtures thereof. The preferred polymers are rigid rod polymers.

By "aramid" is meant a polyamide wherein at least 85% of the amide (—CO—NH—) linkages are attached directly to two aromatic rings. Suitable aramid fibers are described in Man-Made Fibers—Science and Technology, Volume 2, Section titled Fiber-Forming Aromatic Polyamides, page 297, W. Black et al., Interscience Publishers, 1968. Aramid fibers are, also, disclosed in U.S. Pat. Nos. 4,172,938; 3,869,429; 3,819,587; 3,673,143; 3,354,127; and 3,094,511. Additives can be used with the aramid and it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride or the aramid.

One preferred aramid is a para-aramid and poly(p-phenylene terephthalamide) (PPD-T) is the preferred para-aramid. By PPD-T is meant the homopolymer resulting from approximately mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride or 3,4'-diaminodiphenylether.

Polyareneazole polymer may be made by reacting a mix of dry ingredients with a polyphosphoric acid (PPA) solution. The dry ingredients may comprise azole-forming monomers and metal powders. Accurately weighed batches of these dry ingredients can be obtained through employment of at least some of the preferred embodiments of the present invention.

Exemplary azole-forming monomers include 2,5-dimercapto-p-phenylene diamine, terephthalic acid, bis-(4-benzoic acid), oxy-bis-(4-benzoic acid), 2,5-dihydroxyterephthalic acid, isophthalic acid, 2,5-pyridodicarboxylic acid, 2,6-naphthalenedicarboxylic acid, 2,6-quinolinedicarboxylic acid, 2,6-bis(4-carboxyphenyl) pyridobisimidazole, 2,3,5,6-tetraaminopyridine, 4,6-diaminoresorcinol, 2,5-diaminohydroquinone, 1,4-diamino-2,5-dithiobenzene, or any combination thereof. Preferably, the azole forming monomers include 2,3, 5,6-tetraaminopyridine and 2,5-dihydroxyterephthalic acid. In certain embodiments, it is preferred that that the azole-forming monomers are phosphorylated. Preferably, phosphorylated azole-forming monomers are polymerized in the presence of polyphosphoric acid and a metal catalyst.

Metal powders can be employed to help build the molecular weight of the final polymer. The metal powders typically include iron powder, tin powder, vanadium powder, chromium powder, and any combination thereof.

The azole-forming monomers and metal powders are mixed and then the mixture is reacted with polyphosphoric acid to form a polyareneazole polymer solution. Additional polyphosphoric acid can be added to the polymer solution if desired. The polymer solution is typically extruded or spun through a die or spinneret to prepare or spin the filament.

Polybenzoxazole (PBO) and polybenzothiazole (PBZ) are two suitable polymers. These polymers are described in PCT Application No. WO 93/20400. Polybenzoxazole and polybenzothiazole are preferably made up of repetitive units of the following structures:

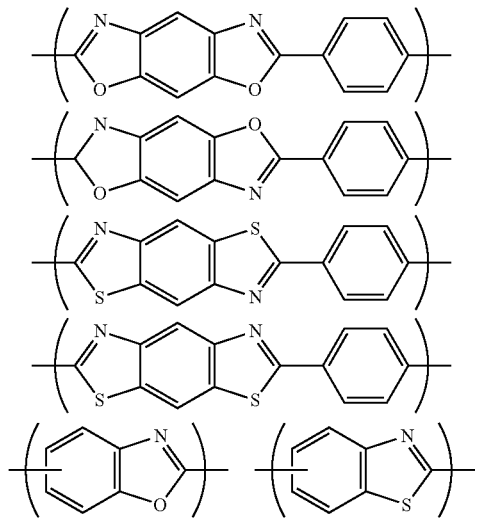

While the aromatic groups shown joined to the nitrogen atoms may be heterocyclic, they are preferably carbocyclic; and while they may be fused or unfused polycyclic systems, they are preferably single six-membered rings. While the group shown in the main chain of the bis-azoles is the preferred para-phenylene group, that group may be replaced by any divalent organic group which doesn't interfere with preparation of the polymer, or no group at all. For example, that group may be aliphatic up to twelve carbon atoms, tolylene, biphenylene, bis-phenylene ether, and the like.

The polybenzoxazole and polybenzothiazole used to make fibers of this invention should have at least 25 and preferably at least 100 repetitive units. Preparation of the polymers and spinning of those polymers is disclosed in the aforementioned PCT application WO 93/20400.

The instant invention can also utilize polypyridobisimidazole fiber. This fiber is made from a rigid rod polymer that is of high strength. The polypyridobisimidazole polymer of this fiber has an inherent viscosity of at least 20 dl/g or at least 25 dl/g or at least 28 dl/g. Such fibers include PIPD fiber (also known as M5® fiber and fiber made from poly[2,6-diimidazo[4,5-b:4,5-e]-pyridinylene-1,4(2,5-dihydroxy)phenylene). PIPD fiber is based on the structure:

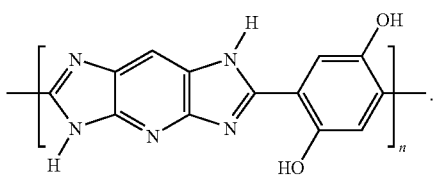

PIPD fibers have been reported to have the potential to have an average modulus of about 310 GPa (2100 grams/denier) and an average tenacity of up to about 5.8 Gpa (39.6 grams/denier). These fibers have been described by Brew, et al., Composites Science and Technology 1999, 59, 1109; Van der Jagt and Beukers, Polymer 1999, 40, 1035; Sikkema, Polymer 1998, 39, 5981; Klop and Lammers, Polymer, 1998, 39, 5987; Hageman, et al., Polymer 1999, 40, 1313.

One method of making rigid rod polypyridoimidazole polymer is disclosed in detail in U.S. Pat. No. 5,674,969 to Sikkema et al. Polypyridoimidazole polymer may be made by reacting a mix of dry ingredients with a polyphosphoric acid (PPA) solution. The dry ingredients may comprise pyridobisimidazole-forming monomers and metal powders. The polypyridobisimidazole polymer used to make the rigid rod fibers used in the fabrics of this invention should have at least 25 and preferably at least 100 repetitive units.

As employed above and throughout the disclosure, the following terms, unless otherwise indicated, shall be understood to have the following meanings.

As used herein, the term "curved" means the face of the surface is defined by a plurality of points and at least two of the points located in different tangential planes to the surface. In some embodiments, the surface has a deviation from a plane surface where the deviation occurs without sharp breaks or angularity.

For purposes herein, the term "filament" refers to a relatively flexible, macroscopically homogeneous body having a high ratio of length to width across its cross-sectional area perpendicular to its length. The filament cross section may be any shape, but is typically circular. The term "filament" may be used interchangeably with the term "fiber."

As herein defined, "yarn" refers to a continuous length of two or more fibers, wherein fiber is as defined hereinabove.

Certain aspects of the invention can be illustrated by FIG. 1. In the type of process illustrated in FIG. 1, a quench tube 34 diameter is chosen based on the anticipated line speed. For example, a 0.06" diameter tube was tested with an average water velocity of less than 50 mpm and a 0.50" diameter tube was tested with an average water velocity of greater than 100 mpm. Results can vary depending on the water level in the quench above the tube and tube surface specifications, but results will be similar. Overall tube length is typically not as much of a factor because water speed is in equilibrium (regardless of tube length) between the acceleration of gravity opposed by pipe friction drag.

A slow process may require a small diameter quench tube which is more difficult to string up. A quench tube too large will not slow the water flow enough, and yarn will pass through the quench faster than the line speed. A change of direction pin or device below the quench can be used to direct the fiber away from the quench water. Any distance between the exit of the quench tube and the change of direction device is uncontrolled and will accelerate downward due to gravity. During the live process, yarn is coupled with quench liquor. If the yarn is pulled at a faster line speed than the equilibrium water velocity, the water will move at yarn speed. If the equilibrium water velocity is faster than the line speed, the yarn will move at the water velocity (faster than line speed). The tube diameter should be smaller to provide some drag on the yarn. Even with a smaller tube and drag, once the yarn and quench liquor exit the quench tube at line speed, the liquor typically accelerates due to gravity faster than line speed.

Parallel plates 30 were designed for this area of uncontrolled acceleration after the exit of the quench tube and before the change of direction device. In one embodiment, two plates were made of clear acrylic with the ability to adjust the gap between the plates. In one embodiment, the quench was set up for average water velocity of 80 mpm. In this embodiment, with the plates spaced 2.5 mm apart and parallel, different speeds were tested with 1500 denier Kevlar® aramid. The plates slowed water flow to create equilibrium conditions for line speeds of 60 mpm (average water velocity through the plates was 60 mpm). With the same conditions line speed was increased to 100 mpm and the plates added 2 g of tension to the yarn. Line speed was increased to 200 mpm and the plates added 10 g of tension to the yarn. The two plates are easy to string up, yarn can be captured at the exit of the quench and pulled down to the change of direction device 32. The yarn will naturally track in-between the two plates. Benefits include better washing caused by turbulence in-between the two plates. The plates can be adjusted quickly for different line speeds.

In some embodiments, the plates are positioned to have a 1.5-50 mm linear distance apart. In certain embodiments, the plates are each 3 mm thick×400 mm long×125 mm wide.

In some embodiments, the quench tube diameter is 4-7 mm and the tube length is 50-300 mm. In some embodiments the plates form a vertical slot and the spinneret, the quench tube, and the vertical slot are all aligned along a centerline, and the width of the vertical slot is smaller than the inside diameter of the quench tube.

Figure 2:
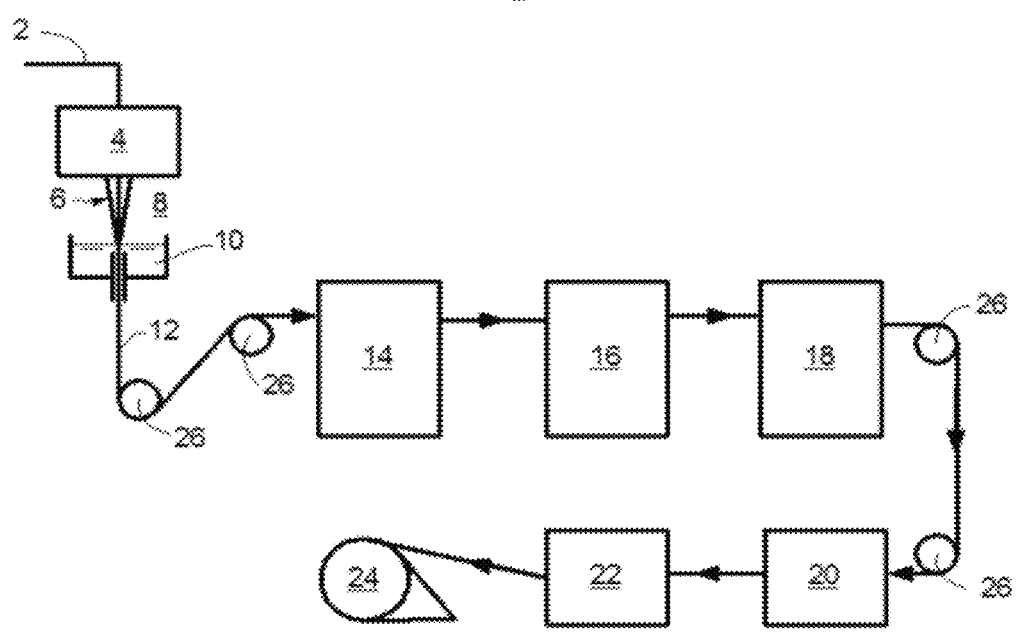
FIG. 2 shows a typical air gap spinning process.

FIG. 2 presents a typical "air-gap" spinning technique. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers, the entirety of each is incorporated by reference herein. In "air-gap" spinning the spinneret typically extrudes the fiber first into a gas, such as air. Using FIG. 2 to help illustrate a process employing "air-gap spinning (also sometimes known as "dry-jet" wet spinning), dope solution 2 exiting the spinneret 4 enters a gap 8 (typically called an "air gap" although it need not contain air) between the spinneret 4 and a coagulation bath 10 for a very short duration of time. The gap 8 may contain any fluid that does not induce coagulation or react adversely with the dope, such as air, nitrogen, argon, helium, or carbon dioxide. The dope filament 6 is drawn across the air gap 8, with or without stretching and immediately introduced into a liquid coagulation bath.

The filament 6 is "coagulated" in the coagulation bath 10 containing water or a mixture of water and phosphoric acid, which removes enough of the polyphosphoric acid to prevent substantial stretching of the filament 6 during any subsequent processing. If multiple fibers are extruded simultaneously, they may be combined into a multifilament yarn before, during or after the coagulation step. The term "coagulation" as used herein does not necessarily imply that the dope filament 6 is a flowing liquid and changes into a solid phase. The degree to which the dope solidifies is dependent on the molecular weight of the polymer in solution and the solution concentration, so the degree to which is solidifies could vary over a wide range of conditions. In most high strength fibers, substantially fully coagulated fibers are formed once they hit the coagulation bath under optimized process conditions. The dope filament 6 can be at a temperature low enough so that it is essentially non-flowing before entering the coagulation bath 10. However, the coagulation bath 10 does ensure or complete the coagulation of the filament, i.e., the conversion of the polymer from a dope solution 2 to a substantially solid polymer filament 12. The amount of solvent, i.e., polyphosphoric acid, removed during the coagulation step will depend on the residence time of the filament 6 in the coagulation bath, the temperature of the bath 10, and the concentration of solvent therein. For example, for polyarenazole polymer, using a 20 weight percent solution of phosphoric acid at a temperature of about 23° C., a residence time of about one second will remove about 70 percent of the solvent present in the filament 6.

The residual polyphosphoric acid associated with the filament is typically substantially hydrolyzed and removed to preserve polymer fiber properties. PPA is conveniently hydrolyzed by heating the filament or yarn prior to washing and/or neutralization steps. One manner of hydrolysis includes convective heating of the coagulated fiber for a short period of time. As an alternative to convective heating, the hydrolysis may be affected by heating the wet, as-coagulated filament or yarn in boiling water or an aqueous acid solution. This treatment provides PPA hydrolysis while adequately retaining the tensile strength of the product fiber. The heat treatment step may occur in a separate cabinet 14, or as an initial process sequence followed by one or more subsequent washing steps in an existing washing cabinet 14. In some embodiments, this is solved by (a) contacting the dope filament with a solution in bath or cabinet 14 thereby hydrolyzing PPA and then (b) contacting the filament with a neutralization solution in bath or cabinet 16 containing water and an effective amount of a base under conditions sufficient to neutralize sufficient quantities of the phosphoric acid, polyphosphoric acid, or any combination thereof in the filament.

After treatment to substantially hydrolyze PPA associated with the coagulated filament, hydrolyzed PPA may be removed from the filament or yarn 12 by washing in one or more washing steps to remove most of the residual acid solvent/and or hydrolyzed PPA from the filament or yarn 12. The washing of the filament or yarn 12 may be carried out by treating the filament or yarn 12 with a base, or with multiple washings where the treatment of the filament or yarn with base is preceded and/or followed by washings with water. The filament or yarn may also be treated subsequently with an acid to reduce the level of cations in the polymer. This sequence of washings may be carried out in a continuous process by running the filament through a series of baths and/or through one or more washing cabinets. FIG. 2 depicts one washing bath or cabinet 14. Washing cabinets typically comprise an enclosed cabinet containing one or more rolls which the filament travels around a number of times, and across, prior to exiting the cabinet. As the filament or yarn 12 travels around the roll, it is sprayed with a washing fluid. The washing fluid is continuously collected in the bottom of the cabinet and drained therefrom.

The temperature of the washing fluid(s) is preferably greater than 30° C. The washing fluid may also be applied in vapor form (steam), but is more conveniently used in liquid form. Preferably, a number of washing baths or cabinets are used. The residence time of the filament or yarn 12 in any one washing bath or cabinet 14 will depend on the desired concentration of residual phosphorus in the filament or yarn 12, but preferably the residence times are in the range of from about one second to less than about two minutes. In a continuous process, the duration of the entire washing process in the preferred multiple washing bath(s) and/or cabinet(s) is preferably no greater than about 10 minutes, more preferably more than about 5 seconds and no greater than about 160 seconds.

In some embodiments, preferred bases for the removal of hydrolyzed PPA include NaOH; KOH; $Na_2CO_3$; $NaHCO_3$; $K_2CO_3$; $KHCO_3$; or trialkylamines, preferably tributylamine; or mixtures thereof. In one embodiment, the base is water soluble.

After treating the fiber with base, the process optionally may include the step of contacting the filament with a washing solution containing water or an acid to remove all or substantially all excess base. This washing solution can be applied in a washing bath or cabinet 18.

The fiber or yarn 12 may be dried in a dryer 20 to remove water and other liquids. The temperature in the dryer is typically about 80° C. to about 130° C. The dryer residence time is typically 5 seconds to perhaps as much as 5 minutes at lower temperatures. The dryer can be provided with a nitrogen or other non-reactive atmosphere. Then the fiber can optionally be further processed in, for instance, a heat setting device 22. Further processing may be done in a nitrogen purged tube furnace 22 for increasing tenacity and/or relieving the mechanical strain of the molecules in the filaments. Finally, the filament or yarn 12 is wound up into a package on a windup device 24. Rolls and motorized devices 26 are suitably positioned to transport the filament or yarn through the process.

Preferably, the phosphorous content of the dried filaments after removal of the hydrolyzed PPA is less than about 5,000 ppm (0.5%) by weight, and more preferably, less than about 4,000 ppm (0.4%) by weight, and most preferably less than about 2,000 ppm (0.2%) by weight.

Typically, the yarn is collected at a speed of at least 50, or at least 100, or at least 250, or at least 500, or at least 800 meters per minute.

The spinnerets used in this process may have any convenient configuration. The holes of the spinneret through which the threadline is extruded may be round or shaped to provide any desired cross-section. Any desired number of holes may be used as limited by the equipment. The preferred range of hole size for the process described herein is 0.1 to 0.5 mm in diameter.

What is claimed:

1. A process for spinning polymer filaments comprising:
    a) extruding a polymer solution to form one or more dope filaments into an air gap above a liquid coagulation bath having a quench tube and containing a coagulation liquid, where the dope filaments are subject to strain;
    b) introducing the dope filaments into the liquid coagulation bath;
    c) forming a downward stream of liquid and coagulated filaments;
    through the quench tube;
    d) contacting the liquid with a surface after the exit of the quench tube and prior to separating the liquid from the coagulated filaments, such that the downward force of gravity on the liquid does not increase the strain on the dope filaments in the air gap, and wherein the coagulated filaments are coupled with the liquid in contact with the surface to increase fluid exchange; and
    e) separating the liquid from the coagulated filaments.

2. A process for spinning polymer filaments comprising:
    a) extruding a polymer solution into dope filaments in an air gap between a spinneret and a liquid coagulation bath having a quench tube and containing a coagulating liquid, the dope filaments having a certain strain in the air gap imparted by one or more pull rolls, b) introducing the dope filaments into the liquid coagulation bath;
c) forming a downward stream of liquid and coagulated filaments through the quench tube,
d) contacting the liquid with a surface after the exit of the quench tube and prior to separating the liquid from the filaments, such that the downward force of gravity on the liquid does not increase the strain on the dope filaments in the air gap, and wherein the coagulated filaments are coupled with the liquid in contact with the surface to increase fluid exchange;
e) separating the liquid from the coagulated filaments, and
f) forwarding the coagulated filaments by the use of one or more pull roll.

3. The process of claim 2, wherein the surface comprises a plate.

4. The process of claim 2, wherein the surface comprises a plurality of plates.

5. The process of claim 3, wherein the surface comprises two parallel plates.

6. The process of claim 3, wherein the plate is formed into a structure comprising a least one curved surface.

7. The process of claim 3, wherein the plate is curved.

8. The process of claim 2, further comprising collecting the coagulated filaments.

9. The process of claim 8, wherein the coagulated filaments are collected by winding the filaments on a tube.

10. The process of claim 9, wherein the coagulated filaments are wound at a speed of at least 500 meters per minute.

11. The process of claim 9, wherein the coagulated filaments are wound at a speed of at least 800 meters per minute.

12. The process of claim 2 wherein the polymer comprises an aramid.

13. The process of claim 12, wherein the aramid is para-aramid.

14. The process of claim 13, wherein the aramid is poly(p-phenylene terephthalamide).

15. The process of claim 2, wherein the polymer comprises a polyareneazole.

16. The process of claim 15, wherein the polyareneazole is polybenzoxazole or polybenzothiazole.

17. The process of claim 2, wherein the polymer comprises poly{2,6-diimidazo[4,5-b4',5'-e]pyridinylene-1,4(2,5-dihydroxy)phenylene}.

* * * * *